(No Model.)
F. H. EVANS.
EXPANSION FASTENING FOR SCREWS AND BOLTS.
No. 317,448. Patented May 5, 1885.
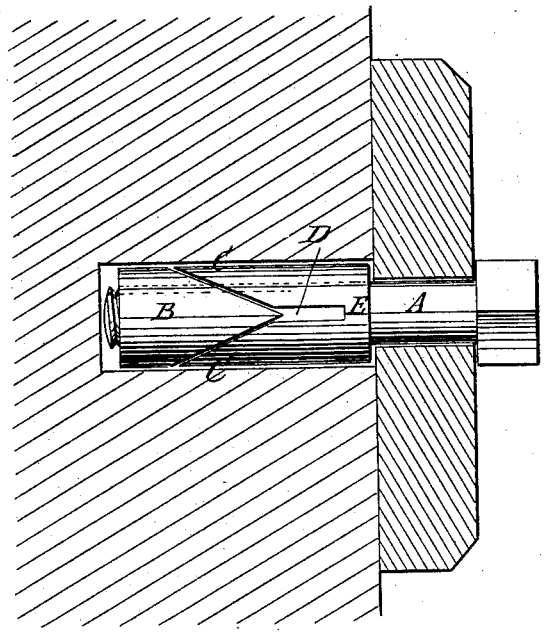
Fig. 1.
Fig. 2.
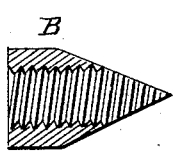
Fig. 3.
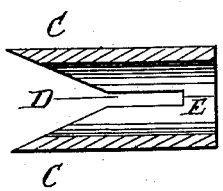
Fig. 4.
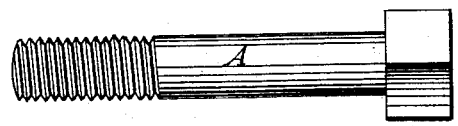
WITNESSES:
INVENTOR:
F. H. Evans
BY Munn & Co
ATTORNEYS.

UNITED STATES PATENT OFFICE.

FREDERIC H. EVANS, OF BROOKLYN, NEW YORK.

EXPANSION-FASTENING FOR SCREWS AND BOLTS.

SPECIFICATION forming part of Letters Patent No. 317,448, dated May 5, 1885.

Application filed March 5, 1885. (No model.)

*To all whom it may concern:*

Be it known that I, FREDERIC H. EVANS, of Brooklyn, in the county of Kings and State of New York, have invented a new and useful Improvement in Expansion-Fastenings for Bolts and Screws, of which the following is a full, clear, and exact description.

Reference is to be had to the accompanying drawings, forming a part of this specification, in which similar letters of reference indicate corresponding parts in all the figures.

Figure 1 is a side elevation of one of my improved expansion-fastenings, illustrating its use. Fig. 2 is a sectional side elevation of the wedge-nut. Fig. 3 is a sectional side elevation of the jaws. Fig. 4 is a side elevation of a bolt.

The object of this invention is to improve the construction of the fastenings for expansion-bolts in such a manner as to lessen the cost of manufacture and make the said fastenings more convenient and reliable in use.

The invention relates to an expansion-fastening for bolts and screws, made with the expansion-jaws formed in one piece, with a solid annular base or connection, and expanded by a wedge-nut drawn between the said jaws by a bolt, whereby the said jaws will not be liable to get out of place or separated, as will be hereinafter fully described and then claimed.

A is a bolt the screw-thread of which fits into the screw-thread of the tubular nut B. The forward end of the tubular nut B is beveled upon two or more sides, forming two or more wedge-shaped points.

C are two or more jaws, made of malleable iron or other suitable material, and so formed as to fit into the bevels of the wedge-nut B, the spaces between the jaws being so formed that the wedges of the nut B will fit into the said spaces. The jaws C are formed in one piece, and with slots D extending from the angles of the spaces between them nearly to the bases of the said jaws, so that the jaws will have a solid annular base or connection, E. With this construction the jaws cannot get out of place or become separated while being handled and being inserted in the bolt-holes.

In using the improvement in the form illustrated in the drawings the wedge-nut B and the jaws C are inserted in the bolt-hole, the object to be fastened is arranged in place over the bolt-hole in which the fastening has been placed, and the bolt A is inserted and screwed home. With some constructions of the bolt A the fastening can be placed upon the bolt, the fastening and bolt inserted together in the bolt-hole and the bolt screwed home. As the bolt A enters the wedge-nut B it draws the said nut outward, forcing its wedges into the spaces between the jaws C, expanding the said jaws or forcing them outward against the walls of the bolt-hole, and bending or breaking the solid annular base or connection of the said jaws. With this construction the pressure of the jaws C against the walls of the bolt-hole will fasten the bolt A securely in place.

If desired, the fastening can be made with jaws C upon both sides of the solid annular base or connection E. In this case a tubular wedge-washer should be placed upon the bolt at the outer end of the fastening, so that both the inner and outer jaws will be expanded when the bolt is screwed home.

The bolts A can be made of any desired size or style, as the purpose for which they are to be used may require.

Having thus fully described my invention, I claim as new and desire to secure by Letters Patent—

1. In an expansion-fastening for bolts and screws, the expansion-jaws C, made in one piece, with a solid annular base or connection, substantially as herein shown and described, whereby the said jaws will not be liable to get out of place or separated, as set forth.

2. The combination, with the bolt A and wedge-nut B, of the jaws C, made in one piece, with a solid annular base or connection, substantially as herein shown and described.

FREDERIC H. EVANS.

Witnesses:
JAMES T. GRAHAM,
C. SEDGWICK.